(12) United States Patent
Tada et al.

(10) Patent No.: US 7,173,776 B2
(45) Date of Patent: Feb. 6, 2007

(54) FISHEYE LENS SYSTEM

(75) Inventors: Eijiroh Tada, Saitama (JP); Takayuki Ito, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 11/168,306

(22) Filed: Jun. 29, 2005

(65) Prior Publication Data

US 2006/0001985 A1 Jan. 5, 2006

(30) Foreign Application Priority Data

Jun. 30, 2004 (JP) ............................... 2004-193225

(51) Int. Cl.
*G03B 9/00* (2006.01)
*G03B 9/62* (2006.01)
*G03B 13/06* (2006.01)
*G03B 9/12* (2006.01)

(52) U.S. Cl. ...................... 359/754; 359/725; 359/755; 359/761; 359/762; 359/691; 359/680; 359/749

(58) Field of Classification Search ................ 359/646, 359/680, 462, 691, 754–756, 725, 749, 761, 359/762, 793, 796, 797
See application file for complete search history.

(56) References Cited

U.S. PATENT DOCUMENTS

| | | | | |
|---|---|---|---|---|
| 3,516,725 A | * | 6/1970 | Ratliff, Jr. .................... | 359/462 |
| 3,524,697 A | | 8/1970 | Isshiki et al. ................ | 359/723 |
| 5,434,713 A | * | 7/1995 | Sato ............................ | 359/725 |
| 5,477,389 A | | 12/1995 | Ito et al. ...................... | 359/752 |
| 5,513,045 A | | 4/1996 | Ito et al. ...................... | 359/750 |

(Continued)

FOREIGN PATENT DOCUMENTS

JP 45-37953 12/1970

(Continued)

OTHER PUBLICATIONS

English Language Abstract of JP 7-84180.

(Continued)

*Primary Examiner*—Loha Ben
(74) *Attorney, Agent, or Firm*—Greenblum & Bernstein, P.L.C.

(57) ABSTRACT

A fisheye lens system with a half angle-of-view of 90° includes a negative front lens group, a diaphragm, and a positive rear lens group.

The negative front lens group includes at least three negative meniscus lens elements each of which has the convex surface facing toward the object; and the three negative meniscus lens elements satisfy the following conditions:

$$0.2 < SF_{(i=1)} < 0.6 \quad (1)$$

$$0.8 < SF_{(i=2)}/SF_{(i=1)} < 1.5 \quad (2)$$

$$0.8 < SF_{(i=3)}/SF_{(i=1)} < 2.0 \quad (3)$$

wherein

SFi designates the shaping factor of the $i^{th}$ ($1 \leq i \leq 3$) negative meniscus lens element ($SFi = (R1i - R2i)/(R1i + R2i)$);

R1i designates the radius of curvature of the object-side surface of the $i^{th}$ ($1 \leq i \leq 3$) negative meniscus lens element; and R2i designates the radius of curvature of the image-side surface of the $i^{th}$ ($1 \leq i \leq 3$) negative meniscus lens element.

6 Claims, 6 Drawing Sheets

U.S. PATENT DOCUMENTS

| | | | |
|---|---|---|---|
| 5,579,169 A | 11/1996 | Mouri | 359/682 |
| 5,684,643 A | 11/1997 | Enomoto et al. | 359/751 |
| 5,724,193 A * | 3/1998 | Hirakawa | 359/691 |
| 6,128,145 A | 10/2000 | Nagaoka | 359/749 |
| 6,844,991 B2 * | 1/2005 | Mizuguchi | 359/749 |
| 6,924,947 B2 | 8/2005 | Saori | 359/749 |
| 6,987,623 B2 * | 1/2006 | Shibayama | 359/691 |
| 7,046,458 B2 * | 5/2006 | Nakayama | 359/725 |

FOREIGN PATENT DOCUMENTS

| | | |
|---|---|---|
| JP | 60-153018 | 8/1985 |
| JP | 4-69611 | 3/1992 |
| JP | 4-69612 | 4/1992 |
| JP | 7-84180 | 3/1995 |
| JP | 9-159912 | 6/1997 |
| JP | 2000-221391 | 8/2000 |

OTHER PUBLICATIONS

English Language Abstract of JP 9-159912.
English Language Abstract of JP 2000-221391.

* cited by examiner

Fig. 1
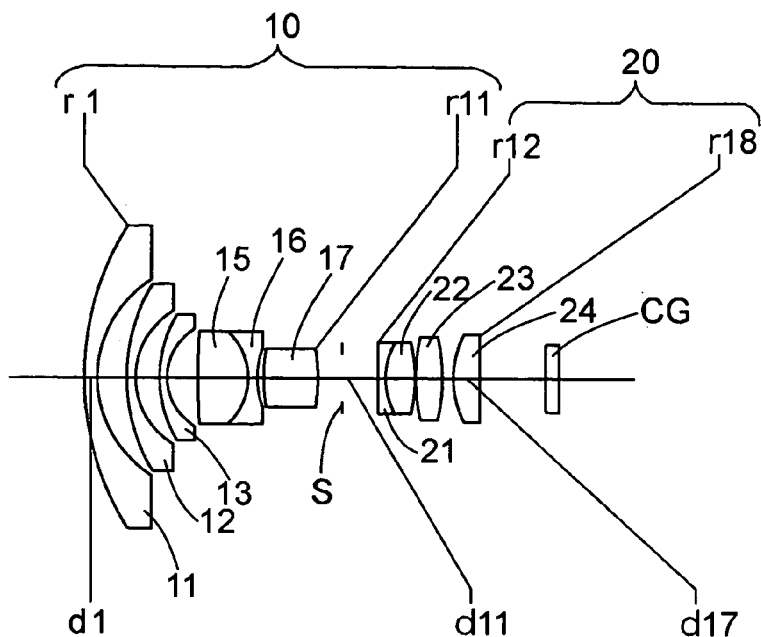
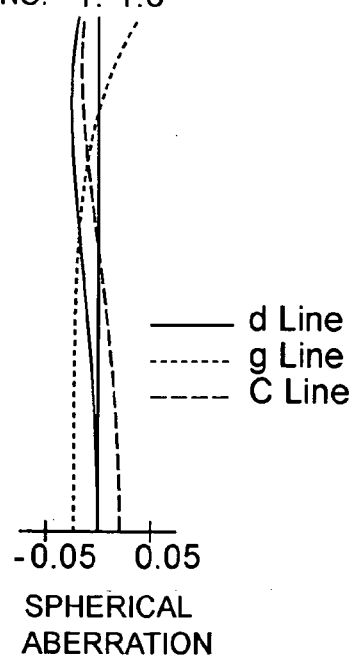
Fig. 2A
FNO.= 1: 1.8
—— d Line
······ g Line
– – – C Line
-0.05   0.05
SPHERICAL
ABERRATION
CHROMATIC
ABERRATION
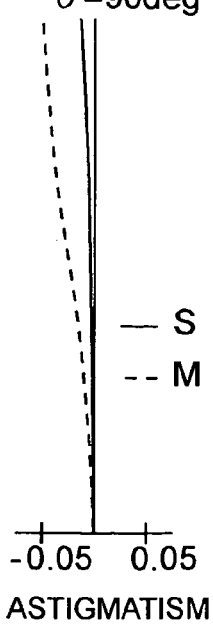
Fig. 2B
θ =90deg
—— S
– – M
-0.05   0.05
ASTIGMATISM
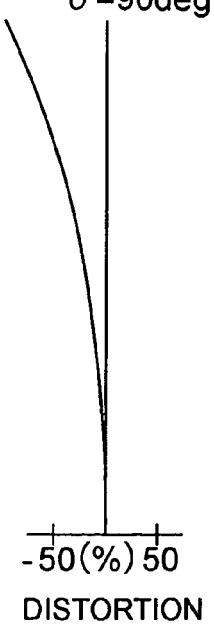
Fig. 2C
θ =90deg
-50(%) 50
DISTORTION

FNO.=1: 1.8

-0.05  0.05

SPHERICAL
ABERRATION

CHROMATIC
ABERRATION

— d Line
····· g Line
– – C Line

θ=90deg

-0.05  0.05

ASTIGMATISM

— S
- - M

θ=90deg

-50(%) 50

DISTORTION

FNO.= 1: 1.8

—— d Line
······ g Line
— — C Line

-0.05   0.05
SPHERICAL
ABERRATION

CHROMATIC
ABERRATION

θ =90deg

—— S
- - M

-0.05   0.05
ASTIGMATISM

θ =90deg

-50 (%) 50
DISTORTION

F$_{NO.}$= 1: 1.8

—— d Line
······ g Line
— — C Line

-0.05　0.05
SPHERICAL
ABERRATION

CHROMATIC
ABERRATION

θ =90deg

—— S
— — M

-0.05　0.05
ASTIGMATISM

θ =90deg

-50 (%) 50
DISTORTION

FNO.= 1: 1.4

— d Line
······ g Line
— — C Line

-0.05  0.05
SPHERICAL
ABERRATION

CHROMATIC
ABERRATION

θ =90deg

— S
— — M

-0.05  0.05
ASTIGMATISM

θ =90deg

-50(%) 50
DISTORTION

FISHEYE LENS SYSTEM

BACKGROUND OF THE INVENTION

1. Field of the Invention

The present invention relates to a fisheye lens system.

2. Description of the Prior Art

A fisheye lens element is classified into four different categories according to the projection method thereof:

(a) Orthographic Projection $y=-f \cdot \sin\theta$
(b) Equisolid-angle Projection $y=-2f \cdot \sin(\theta/2)$
(c) Equidistance Projection $y=-f \cdot \theta$
(d) Stereographic Projection $y=-2f \cdot \tan(\theta/2)$ wherein y designates the image height;
f designates the focal length; and
θ designates the half angle-of-view.

Accordingly, in the above projection method (a), at an image height y with the half angle-of-view of 90°, the image height is y=f.

In the above projection method (b), at an image height y with the half angle-of-view of 90°, y=−1.414f.

In the above projection method (c), at an image height y with a half angle-of-view of 90°, y=−1.571f.

In the above projection method (d), at an image height y with a half angle-of-view of 90°, y=−2f.

Furthermore, when the image height Yx at the half angle-of-view of 90° is determined, the focal length is as follows:

in the above projection method (a), f=−Yx;
in the above projection method (b), f=−Yx/1.414;
in the above projection method (c), f=−Yx/1.571;
in the above projection method (d), f=−Yx/2.

Fisheye lens systems for silver halide film cameras generally have employed the above projection methods (a) and (b). However, in recent digital cameras, due to improvements in image processing technology, a fisheye lens system employing a projection method which has a stronger resolving power at the peripheral portion, e.g., the above projection method (d), has been proposed, as shown in Japanese Unexamined Patent Publication No. 2000-221391.

However, in order to achieve balance between the axial resolving power and the off-axis resolving power, it is desirable to employ a projection method which is similar to the above projection method (c).

SUMMARY OF THE INVENTION

The present invention provides a fisheye lens system having an adequate resolving power from the axial region to the off-axis region in the case where the equidistance projection method or a projection method similar thereto is employed.

In other words, the present invention provides a fisheye lens system which can be used with a high definition solid-state image sensor. More specifically, the fisheye lens system of the present invention is arranged to have a substantially even resolving power within the angle-of-view of 180°; and such a fisheye lens system is suitable for a lens system used in, e.g., a surveillance camera system (CCTV).

The present invention has been devised based on the inventors' following understanding:

The most important factor for a fisheye lens system having a suitable resolving power from the axial region to the off-axis region is how smoothly an object-carrying light is refracted and made incident on the imaging plane. The inventors have found that the configuration of the most object-side lens element is important to achieve the above-mentioned objective. Therefore the present invention is directed to the configuration of the most object-side lens element of the fisheye lens system.

According to an aspect of the present invention, there is provided a fisheye lens system including a front lens group having a negative refractive power (hereinafter, a negative front lens group), a diaphragm, and a rear lens group having a positive refractive power (hereinafter, a positive rear lens group), in this order from the object; and the fisheye lens system has a half angle-of-view of 90°.

The negative front lens group includes at least three negative meniscus lens elements each of which has the convex surface facing toward the object; and the three negative meniscus lens elements satisfy the following conditions:

$$0.2 < SF_{(i=1)} < 0.6 \quad (1)$$

$$0.8 < SF_{(i=2)}/SF_{(i=1)} < 1.5 \quad (2)$$

$$0.8 < SF_{(i=3)}/SF_{(i=1)} < 2.0 \quad (3)$$

wherein

SFi designates the shaping factor: of the $i^{th}$ ($1 \leq i \leq 3$) negative meniscus lens element (SFi=(R1i−R2i)/(R1i+R2i));

R1i designates the radius of curvature of the object-side surface of the $i^{th}$ ($1 \leq i \leq 3$) negative meniscus lens element; and R2i designates the radius of curvature of the image-side surface of the $i^{th}$ ($1 \leq i \leq 3$) negative meniscus lens element.

Another negative meniscus lens element (fourth: i=4) having the convex surface facing toward the object can be provided on the image side of the third (i=3) negative meniscus lens element. The fourth negative meniscus lens element preferably satisfies the following condition:

$$0.8 < SF_{(i=4)}/SF_{(i=1)} < 2.5 \quad (4)$$

In each of the negative front lens group and the positive rear lens group, at least one set of cemented lens elements constituted by a positive lens element and a negative lens element is preferably provided.

Other than conditions (1) to (3) for the three negative meniscus lens elements, the fisheye lens system preferably satisfies the following conditions:

$$-0.5 < f/fF < -0.1 \quad (5)$$

$$0.75 < \{-\Delta y(90)/\Delta\theta(90)\}/(N_{OB} \cdot f) < 1.5 \quad (6)$$

wherein fF designates the focal length of the negative front lens group;

f designates the focal length of the entire the fisheye lens system;

Δθ (90) designates an increment (differential amount) of the angle-of-view from the half angle-of-view of 90° (rad);

Δy(90) designates an increment of an image height (differential amount) when the angle-of-view is increased by Δθ (90) from the half angle-of-view of 90°; and $N_{OB}$ designates the refractive index of air, i.e., on the object side of the negative front lens group.

Other than conditions (1) to (3) for the three negative meniscus lens elements, the fisheye lens system preferably satisfies the following condition:

$$3.2 < fB/f < 5.0 \quad (7)$$

wherein fB designates the back focal distance (the equivalent air thickness from the rear-most image-side surface of the positive rear lens group to the imaging plane).

The present disclosure relates to subject matter contained in Japanese Patent Application No. 2004-193225 (filed on Jun. 30, 2004) which is expressly incorporated herein in its entirety.

BRIEF DESCRIPTION OF THE DRAWINGS

The present invention will be discussed below in detail with reference to the accompanying drawings, in which:

FIG. 1 is a lens arrangement of the fisheye lens system, according to a first embodiment of the present invention;

FIGS. 2A, 2B and 2C show aberrations occurred in the lens arrangement of FIG. 1;

DESCRIPTION OF THE EMBODIMENTS

According to the lens arrangements of the first to fifth embodiments (FIGS. 1, 3, 5, 7 and 9), the fisheye lens system includes a negative front lens group 10, a diaphragm S, and a positive rear lens group 20, in this order from the object, and has a half angle-of-view of 90°.

In the first through fourth embodiments shown in FIGS. 1, 3, 5 and 7, the negative front lens group 10 includes three negative meniscus lens elements 11, 12 and 13, each of which has the convex surface facing toward the object, in this order from the object.

Figure 9:
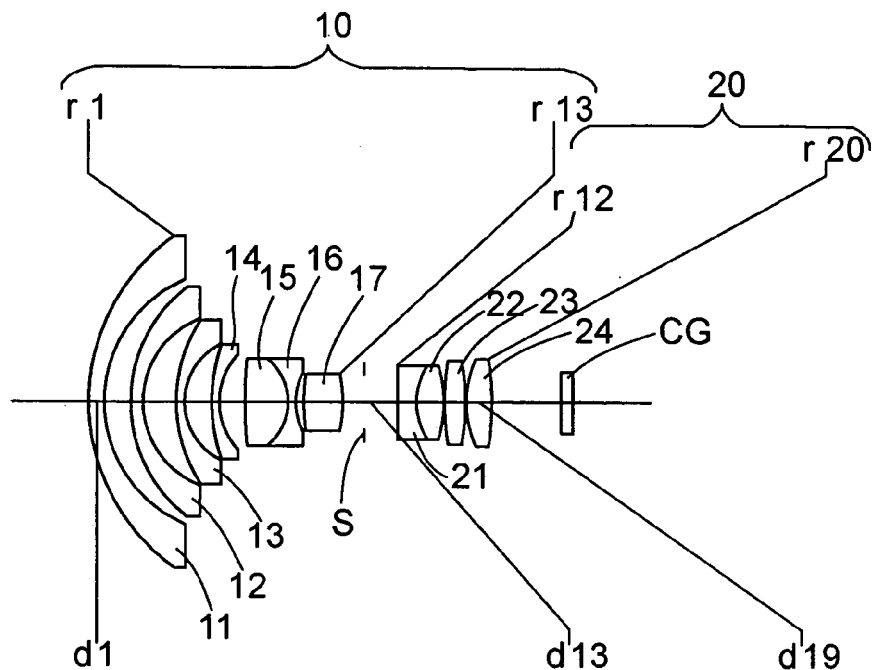
FIG. 9 is a lens arrangement of the fisheye lens system, according to a fifth embodiment of the present invention.

In the fifth embodiment shown in FIG. 9, the negative front lens group 10 includes four negative meniscus lens elements 11, 12, 13 and 14, each of which has the convex surface facing toward the object, in this order from the object.

In other words, in each embodiment, it is essential for the negative first lens group 10 to include at least three meniscus lens elements, each of which has the convex surface facing toward the object.

In addition to the above-explained three or four negative meniscus lens elements, the negative front lens group 10 further includes cemented lens elements constituted by a positive lens element 15 and a negative lens element 16, and a positive biconvex lens element 17, in this order from the object.

In the first to fifth embodiments, the positive rear lens group 20 includes cemented lens elements constituted by a negative lens element 21 and a positive lens element 22, a positive biconvex lens element 23, and a positive lens element 24 having a convex surface facing toward the object, in this order from the object.

A cover glass (filter group) CG is positioned in front of the imaging device.

The lens arrangement of the positive rear lens group 20 and the lens arrangement other than the three or four negative meniscus lens elements of the negative front lens group 10 are not essential for the present invention. However, providing at least one set of cemented lens elements in each of the front lens group 10 and the rear lens group 20 can finely correct chromatic aberration; and the fisheye lens system of the present invention can be made suitable for a high definition solid-state image sensor.

Conditions (1), (2), (3) and (4) specify the configurations of the three or four negative meniscus lens elements of the negative front lens group 10. In other words, by satisfying these conditions, three or four negative meniscus lens elements are arranged to have substantially the same shaping factor, i.e., these negative meniscus lens element have a similar shape with each other.

In a fisheye lens system having the half angle-of-view of 90°, in order to achieve the substantially the same resolving power between the axial region and the off-axis region, it is preferable that off-axis light rays be gradually refracted and be made incident on the imaging plane. Note that the three or four negative meniscus lens elements of the negative front lens group 10 are most important for achieving the above-mentioned substantially the same resolving power between the axial region and the off-axis region.

It is essential for conditions (1) to (3) to be satisfied at the same time. If any one of these conditions is not satisfied, the balance of refractive power among the three negative meniscus lens elements 11 to 13 cannot be maintained. Consequently, it is difficult for other negative meniscus lens elements to correct coma, field curvature and distortion occurred in the negative meniscus lens element by which a stronger negative refractive power is shared.

For example, if $SF_{(i=1)}$ exceeds the lower limit of conditions (1), the negative refractive power of the first negative meniscus lens element 11 becomes too weak. Consequently, light rays at the half angle-of-view of 90° cannot be made incident on the imaging plane, and the fisheye lens system cannot cover the half angle-of-view of 90°.

If $SF_{(i=1)}$ exceeds the upper limit of conditions (1), it is advantageous to cover light rays up to the half angle-of-view of 90°. However, the negative refractive power of the first negative meniscus lens element 11 becomes too strong, so that resolving power at the peripheral portion of the first negative meniscus lens element 11 deteriorates.

The same can be applied to conditions (2) and (3), in the case where the lower and upper limits of conditions (2) and (3) are exceeded.

Condition (4) is to be satisfied by the fourth (the most image-side) negative meniscus lens element 14 in the case where the four negative meniscus lens elements are provided in the negative front lens group 10.

Similar to conditions (1) to (3), if $SF_{(i=4)}/SF_{(i=1)}$ exceeds the lower limit of conditions (4), the negative refractive power of the fourth negative meniscus lens element 14 becomes too weak. Consequently, light rays at the half angle-of-view of 90° cannot be made incident on the imaging plane, and the fisheye lens system cannot cover the half angle-of-view of 90°.

If $SF_{(i=4)}/SF_{(i=1)}$ exceeds the upper limit of conditions (4), it is advantageous to cover light rays up to the half angle-of-view of 90°. However, the negative refractive power of the fourth negative meniscus lens element 14 becomes too strong, so that resolving power at the peripheral portion of the fourth negative meniscus lens element 14 deteriorates.

On the other hand, it is noted that providing the four negative meniscus lens elements 11 to 14 can reduce the amount of refractive power to be shared by one negative meniscus lens element, compared with providing the three negative meniscus lens elements 11 to 13. Accordingly, with the four negative meniscus lens elements 11 to 14, it becomes easier to correct aberrations.

Condition (5) is for suitably correcting aberrations while the longer back focal distance is maintained. Note that the fisheye lens system in each embodiment of the present invention is designed to be mainly used in a CCTV camera. Therefore a relatively longer back focal distance is essential.

If f/fF exceeds the upper limit of condition (5), the negative refractive power of the negative front lens group 10 becomes weaker. Consequently, in the positive rear lens group 20, the lens elements closer to the object have to be provided with a stronger diverging refractive power. Then, it becomes difficult to correct aberrations occurred in the lens elements having a stronger diverging refractive power by other lens elements in the positive rear lens group 20.

If f/fF exceeds the lower limit of condition (5), it is advantageous to achieve a longer back focal distance. However, the negative refractive power of the front lens group 10 becomes too strong, aberrations occurred in the negative front lens group 10 cannot be corrected by the positive rear lens group 20.

Figure 11:
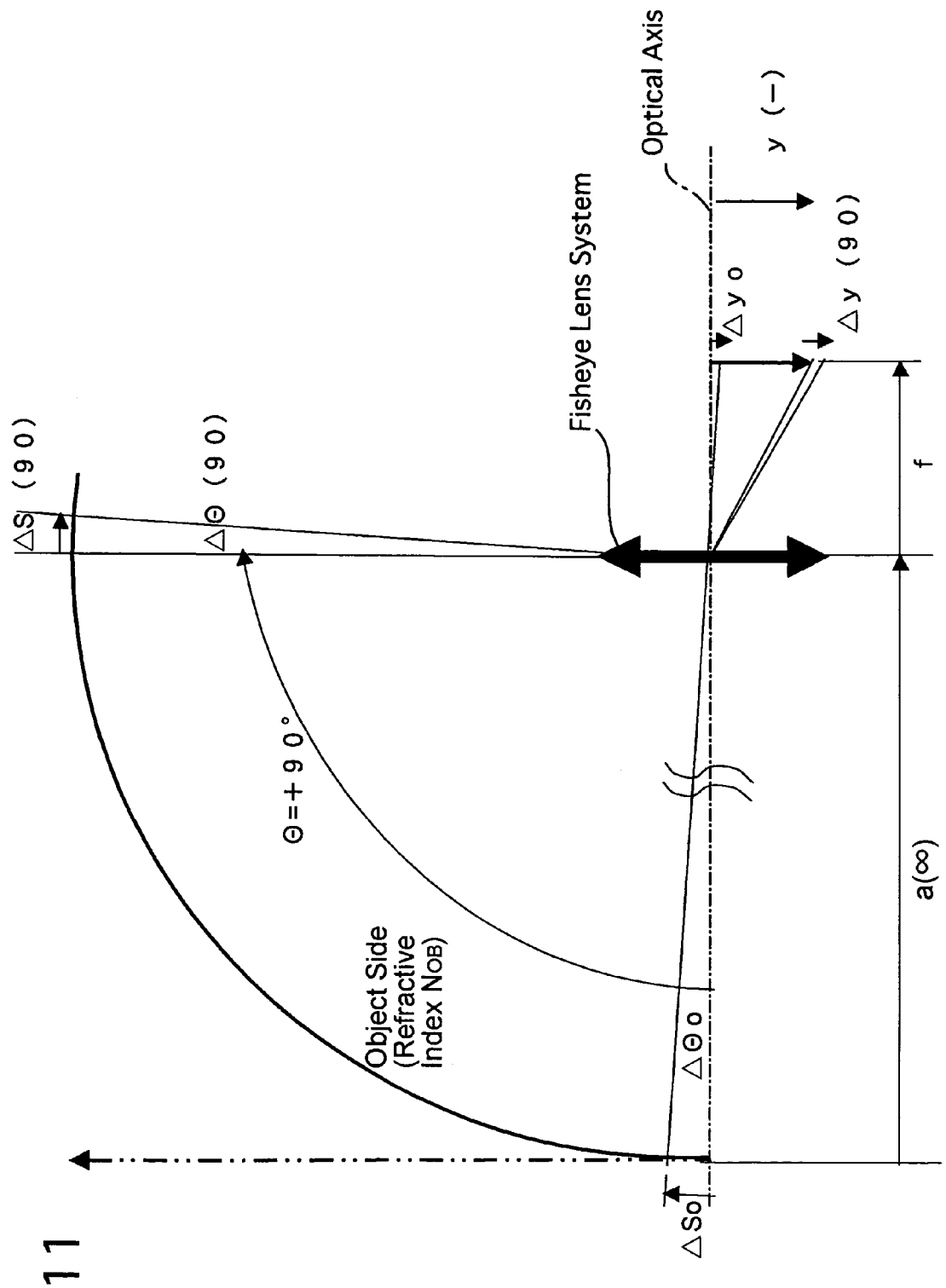
FIG. 11 is a diagram illustrating a comparison between the axial resolving power and the off-axis resolving power of the fisheye lens system.

Condition (6) relates to a projection method used in the fisheye lens system. FIG. 11, which is provided to explain condition (6), is a diagram illustrating a comparison between the axial resolving power and the off-axis resolving power of the fisheye lens system.

More specifically, FIG. 11 indicates the ratio of the axial resolving power of the fisheye lens system on the object side to the off-axis resolving power on the object side under the condition that the resolving power on the imaging plane is constant, i.e., on the imaging plane, the off-axis resolving power is equal to the axial resolving power.

Assuming that the resolving power on the imaging plane side is constant, i.e., the off-axis resolving power is equal to the axial resolving power, the resolving power on the object side is inversely proportional to an increment $\Delta S$ of the circumference of the object-side light rays at the half angle-of-view of 90° when an increment $\Delta y$ of the image height on the imaging plane side is constant; while, the resolving power on the object side is proportional to an increment $\Delta y$ of the image height on the imaging plane side when an increment $\Delta S$ of the circumference of the object-side light rays at the half angle-of-view of 90° is constant.

Accordingly, the ratio of the axial resolving power on the object side to the resolving power on the object side at the half angle-of-view of 90° can be defined as:

$$-\Delta yo/\Delta So:-\Delta y(90)/\Delta S(90) \quad (A)$$

$$\Delta So = a \cdot \Delta \theta o$$

$$\Delta S(90) = a \cdot \theta(90)$$

wherein $\Delta yo$ designates the resolving power, on the imaging plane side, of the axial light rays;

$\Delta y(90)$ designates the resolving power, on the imaging plane side, of the light rays at a half angle-of-view of 90°;

$\Delta So$ designates an increment (differential amount) of the circumference of the object-side axial light rays;

$\Delta S(90)$ designates an increment (differential amount) of the circumference of the object-side light rays at the half angle-of-view of 90°;

$\Delta \theta o$ designates an increment (differential amount) of the angle-of-view from the optical axis;

$\Delta \theta (90)$ designates an increment of the angle-of-view from the light rays at the half angle-of-view of 90°; and 'a' designates the distance from the fisheye lens system to the object.

Then, the equation (A) is:

$$-\Delta yo/\Delta \theta o:-\Delta y(90)/\Delta \theta(90)$$

Here, in relation to the equidistance projection method, $$-\Delta yo = N_{OB} \cdot \Delta \theta o \cdot f$$

and hence, $$-\Delta yo/\Delta \theta o = N_{OB} \cdot f$$

wherein $N_{OB}$ designates the refractive index of air, i.e., on the object side of the negative front lens group.

Accordingly, the ratio of the axial resolving power to the off-axis resolving power at the half angle-of-view of 90° can be defined as follows:

$$\{-\Delta y(90)/\Delta \theta(90)\}/(N_{OB} \cdot f) \quad (6)$$

If $\{-\Delta y(90)/\Delta \theta(90)\}/(N_{OB} \cdot f)$ exceeds the lower limit of condition (6), the off-axis resolving power on the object side becomes lower, similar to the orthographic projection method and the equisolid-angle projection method.

If $\{-\Delta y(90)/\Delta \theta(90)\}/(N_{OB} \cdot f)$ exceeds the upper limit of condition (6), it is advantageous to increase the off-axis resolving power on the object side. However, it becomes difficult to maintain the resolving power on the imaging plane constant.

Condition (7) specifies the back focal distance necessary for the fisheye lens system of the present invention.

If fB/f exceeds the lower limit of condition (7), the back focal distance cannot be made longer.

If fB/f exceeds the upper limit of condition (7), the overall size of the fisheye lens system becomes undesirably larger.

Specific numerical data of the embodiments will be described hereinafter.

In the diagrams of chromatic aberration (axial chromatic aberration) represented by spherical aberration, the solid line and the two types of dotted lines respectively indicate spherical aberrations with respect to the d, g and C lines.

In the diagrams of astigmatism, S designates the sagittal image, and M designates the meridional image.

In the tables, FNo. designates the f-number, f designates the focal length of the fisheye lens system, $\theta$ designates the half angle-of-view (°), fB designates the back focal distance (the equivalent air thickness from the most image-side surface of the positive rear lens group 20 to the imaging plane), r designates the radius of curvature, d designates the lens-element thickness or distance between lens elements, Nd designates the refractive index of the d-line (wavelength 588 nm), and $\nu$ designates the Abbe number.

[Embodiment 1]

FIG. 1 is the lens arrangement of the fisheye lens system, according to the first embodiment of the present invention. FIGS. 2A, 2B and 2C show aberrations occurred in the lens arrangement of FIG. 1. Table 1 shows the numerical data for the first embodiment. The diaphragm S is provided 3.328 behind the first lens group 10 (surface No. 11).

TABLE 1

FNo = 1:1.8
f = 2.96
θ = 89.6
fB = 10.01

| Surf.No. | r | d | Nd | ν |
|---|---|---|---|---|
| 1 | 38.707 | 1.80 | 1.51633 | 64.1 |
| 2 | 15.733 | 3.97 | | |
| 3 | 24.769 | 1.20 | 1.77250 | 49.6 |
| 4 | 10.615 | 3.26 | | |
| 5 | 16.814 | 1.00 | 1.77250 | 49.6 |
| 6 | 7.735 | 4.18 | | |
| 7 | 121.674 | 6.73 | 1.69895 | 30.1 |
| 8 | −8.589 | 1.18 | 1.72916 | 54.7 |
| 9 | 10.821 | 0.87 | | |
| 10 | 25.355 | 7.13 | 1.75520 | 27.5 |
| 11 | −25.355 | 8.17 | | |
| 12 | 310.905 | 1.04 | 1.84666 | 23.8 |
| 13 | 10.209 | 3.84 | 1.72916 | 54.7 |
| 14 | −21.803 | 0.10 | | |
| 15 | 25.683 | 3.61 | 1.48749 | 70.2 |
| 16 | −25.683 | 1.49 | | |
| 17 | 13.401 | 3.48 | 1.48749 | 70.2 |
| 18 | 15471.231 | 8.86 | | |
| 19 | ∞ | 1.75 | 1.51633 | 64.1 |
| 20 | ∞ | — | | |

[Embodiment 2]

Figure 3:
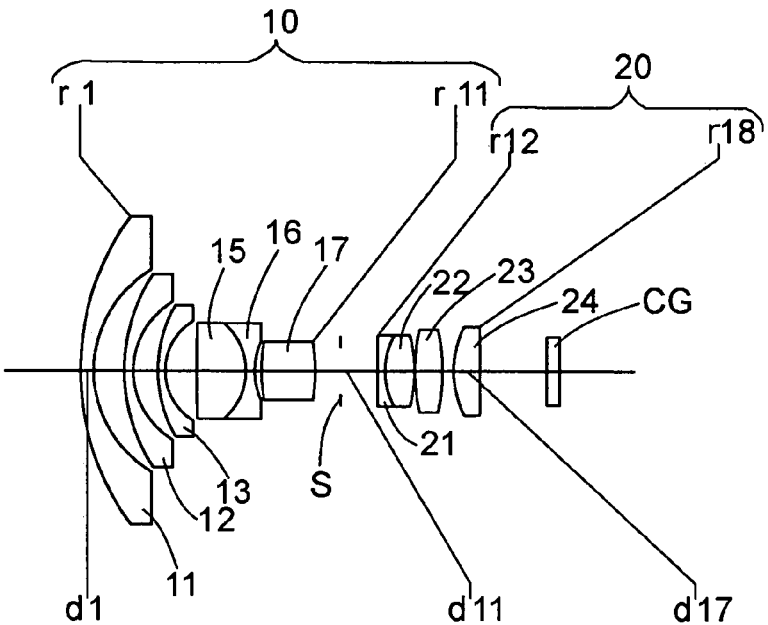
FIG. 3 is a lens arrangement of the fisheye lens system, according to a second embodiment of the present invention.
Figure 4A:
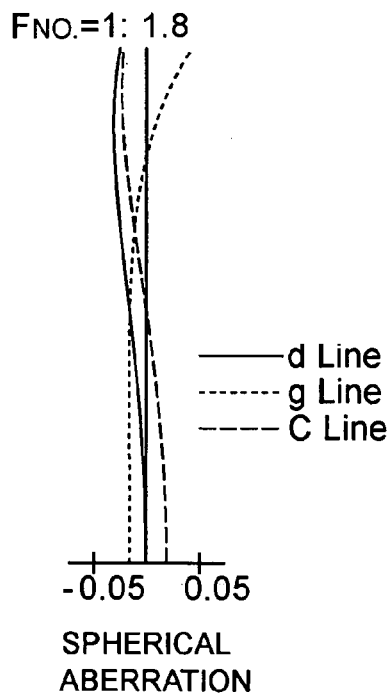
FIGS. 4A, 4B and 4C show aberrations occurred in the lens arrangement of FIG. 3.
Figure 4B:
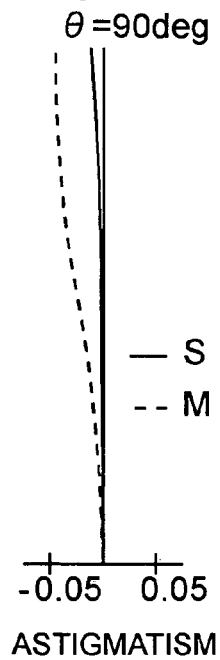
Figure 4C:
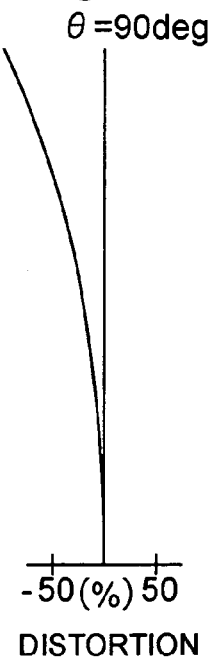

FIG. 3 is the lens arrangement of the fisheye lens system, according to the second embodiment of the present invention. FIGS. 4A, 4B and 4C show aberrations occurred in the lens arrangement of FIG. 3. Table 2 shows the numerical data for the second embodiment. The basic lens arrangement of the second embodiment is the same as the first embodiment. The diaphragm S is provided 3.367 behind the first lens group 10 (surface No. 11).

TABLE 2

FNo = 1:1.8
f = 2.91
θ = 89.0
fB = 10.00

| Surf.No. | r | d | Nd | ν |
|---|---|---|---|---|
| 1 | 35.849 | 1.80 | 1.51633 | 64.1 |
| 2 | 16.160 | 4.04 | | |
| 3 | 24.213 | 1.20 | 1.77250 | 49.6 |
| 4 | 10.957 | 3.28 | | |
| 5 | 17.758 | 1.00 | 1.77250 | 49.6 |
| 6 | 8.000 | 4.22 | | |
| 7 | 292.600 | 6.59 | 1.69895 | 30.1 |
| 8 | −8.580 | 1.18 | 1.72916 | 54.7 |
| 9 | 9.680 | 0.93 | | |
| 10 | 24.330 | 7.14 | 1.75520 | 27.5 |
| 11 | −24.330 | 8.22 | | |
| 12 | 517.000 | 1.02 | 1.84666 | 23.8 |
| 13 | 10.248 | 3.87 | 1.72916 | 54.7 |
| 14 | −19.920 | 0.10 | | |
| 15 | 26.416 | 3.61 | 1.48749 | 70.2 |
| 16 | −26.416 | 1.49 | | |
| 17 | 14.000 | 3.46 | 1.48749 | 70.2 |
| 18 | −298.345 | 8.85 | | |
| 19 | ∞ | 1.75 | 1.51633 | 64.1 |
| 20 | ∞ | — | | |

[Embodiment 3]

Figure 5:
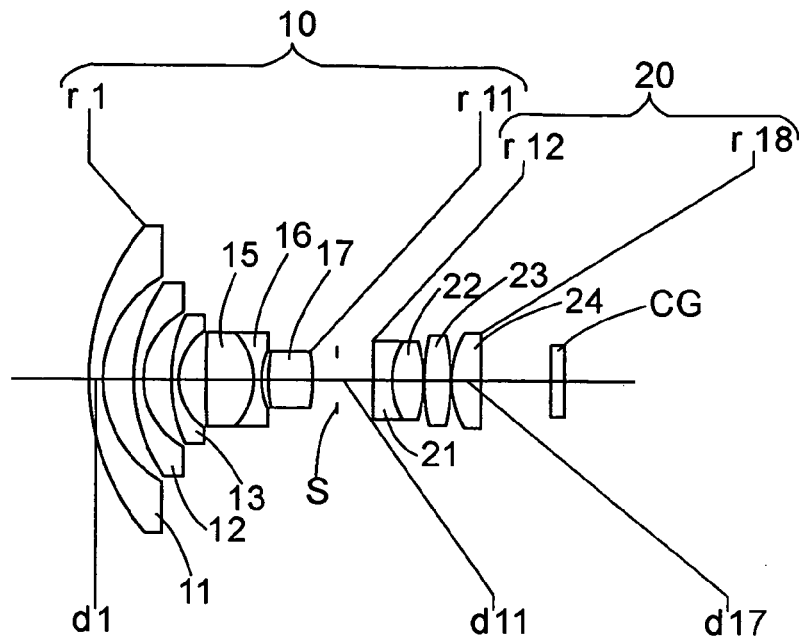
FIG. 5 is a lens arrangement of the fisheye lens system, according to a third embodiment of the present invention.
Figure 6A:
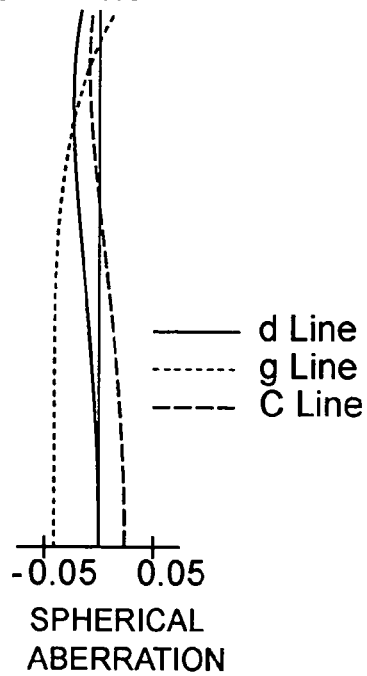
FIGS. 6A, 6B and 6C show aberrations occurred in the lens arrangement of FIG. 5.
Figure 6B:
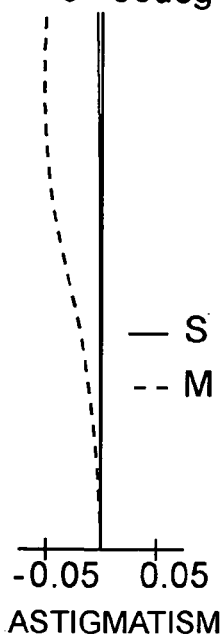
Figure 6C:
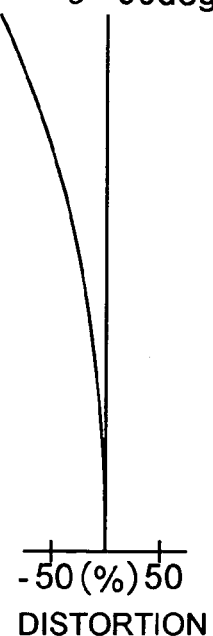

FIG. 5 is the lens arrangement of the fisheye lens system, according to the third embodiment of the present invention. FIGS. 6A, 6B and 6C show aberrations occurred in the lens arrangement of FIG. 5. Table 3 shows the numerical data for the third embodiment. The basic lens arrangement of the third embodiment is the same as the first embodiment. The diaphragm S is provided 3.059 behind the first lens group 10 (surface No. 11).

TABLE 3

FNo = 1:1.8
f = 2.85
θ = 89.0
fB = 10.11

| Surf.No. | r | d | Nd | ν |
|---|---|---|---|---|
| 1 | 31.310 | 1.80 | 1.51633 | 64.1 |
| 2 | 15.526 | 4.02 | | |
| 3 | 22.415 | 1.20 | 1.77250 | 49.6 |
| 4 | 10.053 | 3.61 | | |
| 5 | 19.896 | 1.00 | 1.77250 | 49.6 |
| 6 | 7.774 | 3.50 | | |
| 7 | 144.158 | 6.19 | 1.69895 | 30.1 |
| 8 | −8.933 | 1.01 | 1.72916 | 54.7 |
| 9 | 9.121 | 0.89 | | |
| 10 | 21.240 | 5.66 | 1.75520 | 27.5 |
| 11 | −21.240 | 7.66 | | |
| 12 | −195.230 | 2.44 | 1.84666 | 23.8 |
| 13 | 10.609 | 3.98 | 1.72916 | 54.7 |
| 14 | −17.468 | 0.10 | | |
| 15 | 27.070 | 3.35 | 1.48749 | 70.2 |
| 16 | −27.070 | 0.14 | | |
| 17 | 13.117 | 3.68 | 1.48749 | 70.2 |
| 18 | −962.470 | 8.95 | | |
| 19 | ∞ | 1.75 | 1.51633 | 64.1 |
| 20 | ∞ | — | | |

[Embodiment 4]

Figure 7:
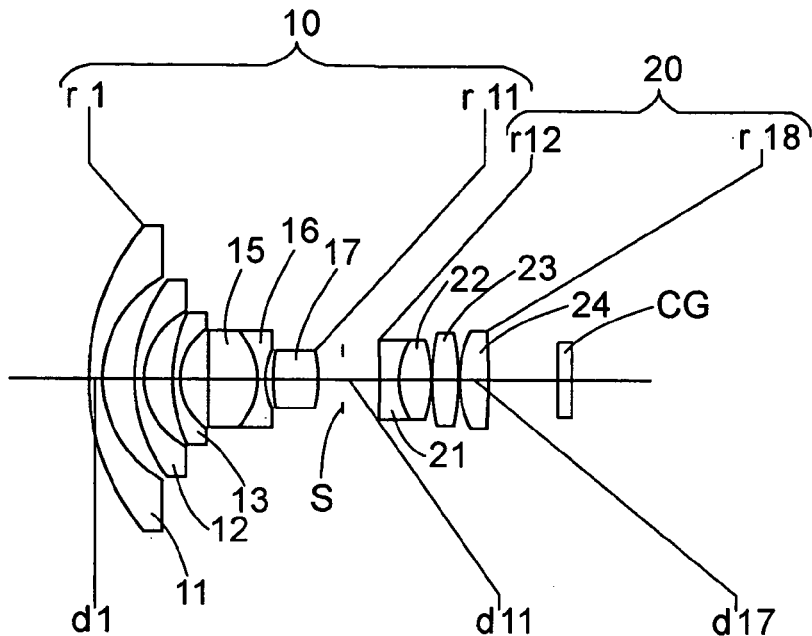
FIG. 7 is a lens arrangement of the fisheye lens system according to a fourth embodiment of the present invention.
Figure 8A:
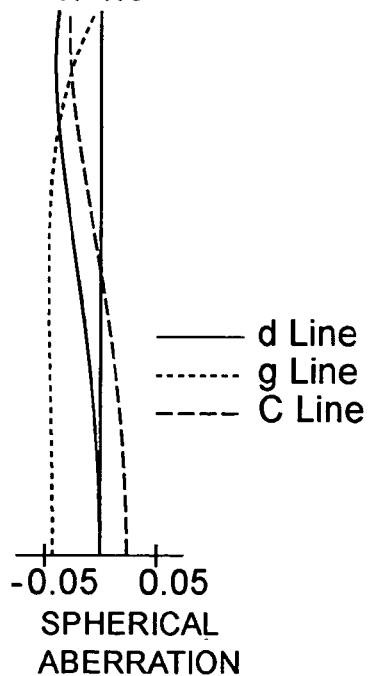
FIGS. 8A, 8B and 8C show aberrations occurred in the lens arrangement of FIG. 7.
Figure 8B:
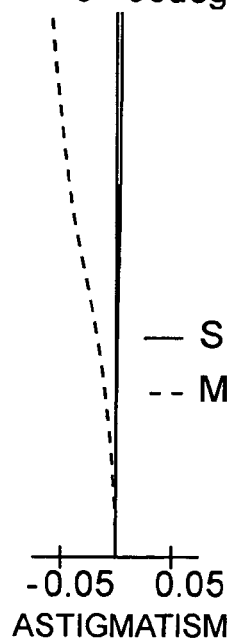
Figure 8C:
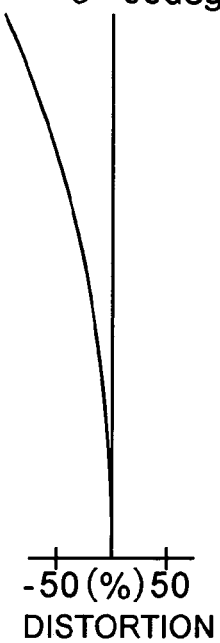

FIG. 7 is the lens arrangement of the fisheye lens system, according to the fourth embodiment of the present invention. FIGS. 8A, 8B and 8C show aberrations occurred in the lens arrangement of FIG. 7. Table 4 shows the numerical data for the fourth embodiment. The basic lens arrangement of the fourth embodiment is the same as the first embodiment. The diaphragm S is provided 3.081 behind the first lens group 10 (surface No. 11).

TABLE 4

FNo = 1:1.8
f = 2.80
θ = 89.0
fB = 10.00

| Surf.No. | r | d | Nd | ν |
|---|---|---|---|---|
| 1 | 30.807 | 1.80 | 1.51633 | 64.1 |
| 2 | 14.967 | 4.06 | | |
| 3 | 21.174 | 1.20 | 1.77250 | 49.6 |
| 4 | 9.752 | 3.63 | | |
| 5 | 19.668 | 1.00 | 1.77250 | 49.6 |
| 6 | 7.861 | 3.58 | | |
| 7 | −8095.035 | 6.16 | 1.69895 | 30.1 |
| 8 | −9.157 | 1.00 | 1.72916 | 54.7 |
| 9 | 9.229 | 0.96 | | |
| 10 | 24.214 | 5.63 | 1.75520 | 27.5 |
| 11 | −17.585 | 7.72 | | |
| 12 | −211.945 | 2.44 | 1.84666 | 23.8 |
| 13 | 10.159 | 4.07 | 1.72916 | 54.7 |
| 14 | −16.837 | 0.10 | | |
| 15 | 29.479 | 3.35 | 1.48749 | 70.2 |
| 16 | −29.180 | 0.13 | | |
| 17 | 14.436 | 3.68 | 1.48749 | 70.2 |
| 18 | −106.240 | 8.85 | | |
| 19 | ∞ | 1.75 | 1.51633 | 64.1 |
| 20 | ∞ | — | | |

[Embodiment 5]

Figure 10A:
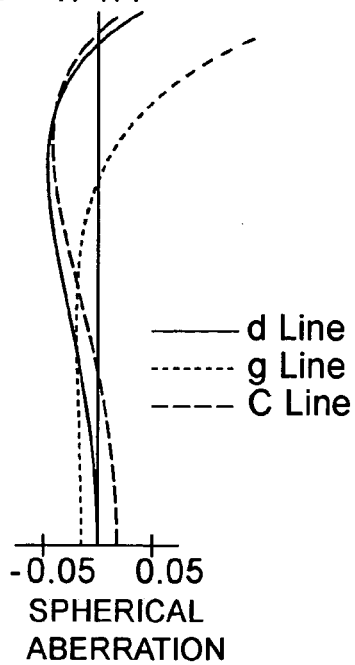
FIGS. 10A, 10B and 10C show aberrations occurred in the lens arrangement of FIG. 9.
Figure 10B:
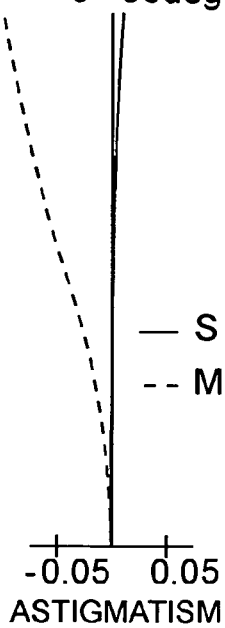
Figure 10C:
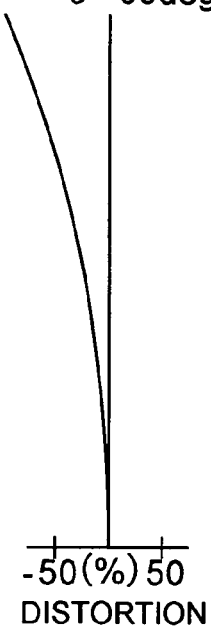

FIG. 9 is the lens arrangement of the fisheye lens system, according to the fifth embodiment of the present invention. FIGS. 10A, 10B and 10C show aberrations occurred in the lens arrangement of FIG. 9. Table 5 shows the numerical data for the fifth embodiment. The basic lens arrangement of the fifth embodiment is the same as the first embodiment except for the first lens group 10 having the four negative meniscus lens elements on the object side. The diaphragm S is provided 2.711 behind the first lens group 10 (surface No. 13).

TABLE 5

FNo = 1:1.4
f = 2.22
θ = 89.0
fB = 9.91

| Surf.No. | r | d | Nd | ν |
|---|---|---|---|---|
| 1 | 26.833 | 2.00 | 1.69680 | 55.5 |
| 2 | 17.527 | 3.44 | | |
| 3 | 19.107 | 1.62 | 1.77250 | 49.6 |
| 4 | 11.839 | 4.31 | | |
| 5 | 19.781 | 1.08 | 1.77250 | 49.6 |
| 6 | 8.570 | 3.52 | | |
| 7 | 24.246 | 0.90 | 1.77250 | 49.6 |
| 8 | 9.179 | 3.29 | | |
| 9 | 58.677 | 5.59 | 1.69895 | 30.1 |
| 10 | −7.393 | 1.02 | 1.72916 | 54.7 |
| 11 | 8.169 | 1.06 | | |
| 12 | 26.674 | 5.09 | 1.75520 | 27.5 |
| 13 | −17.804 | 7.05 | | |
| 14 | −957.980 | 2.45 | 1.84666 | 23.8 |
| 15 | 8.744 | 3.54 | 1.72916 | 54.7 |
| 16 | −15.915 | 0.09 | | |
| 17 | 35.413 | 2.65 | 1.48749 | 70.2 |
| 18 | −29.483 | 0.10 | | |
| 19 | 13.705 | 3.23 | 1.48749 | 70.2 |
| 20 | −39.825 | 8.88 | | |
| 21 | ∞ | 1.57 | 1.51633 | 64.1 |
| 22 | ∞ | — | | |

The numerical values of each embodiment for each condition are shown in Table 6.

TABLE 6

| | Embod. 1 | Embod. 2 | Embod. 3 | Embod. 4 | Embod. 5 |
|---|---|---|---|---|---|
| Condition (1) | 0.422 | 0.379 | 0.337 | 0.346 | 0.210 |
| Condition (2) | 0.948 | 0.996 | 1.130 | 1.167 | 1.120 |
| Condition (3) | 0.876 | 1.001 | 1.300 | 1.239 | 1.885 |
| Condition (4) | — | — | — | — | 2.149 |
| Condition (5) | −0.313 | −0.324 | −0.310 | −0.273 | −0.286 |
| Condition (6) | 0.814 | 0.905 | 0.985 | 1.085 | 1.317 |
| Condition (7) | 3.384 | 3.435 | 3.545 | 3.571 | 4.507 |

As, can be understood from Table 6, the numerical values of each embodiment satisfy each of conditions (1) through (7), and as shown in the aberration diagrams, the various aberrations are well corrected.

According to the above description, a fisheye lens system which can take a photograph with constant resolving power from the axial region to the off-axis region can be obtained.

The fisheye lens system of the present invention is suitable for a high definition digital camera; however, a silver halide film camera with the fisheye lens system of the present invention can also provide a photographer with newer photographic expressions.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A fisheye lens system comprises a negative front lens group, a diaphragm, and a positive rear lens group, in this order from an object; and said fisheye lens system has a half angle-of-view of 90°, wherein said negative front lens group comprises at least three negative meniscus lens elements each of which has the convex surface facing toward the object; and wherein said three negative meniscus lens elements satisfy the following conditions:

$$0.2 < SF_{(i=1)} < 0.6$$

$$0.8 < SF_{(i=2)}/SF_{(i=1)} < 1.5$$

$$0.8 < SF_{(i=3)}/SF_{(i=1)} < 2.0$$

wherein

SFi designates the shaping factor of the $i^{th}$ ($1 \leq i \leq 3$) negative meniscus lens element ($SFi=(R1i-R2i)/(R1i+R2i)$);

R1$i$ designates the radius of curvature of the object-side surface of the $i^{th}$ ($1 \leq i \leq 3$) negative meniscus lens element; and R2$i$ designates the radius of curvature of the image-side surface of the $i^{th}$ ($1 \leq i \leq 3$) negative meniscus lens element.

2. The fisheye lens system according to claim 1, further comprising a fourth negative meniscus lens element having the convex surface facing toward the object, and wherein said fourth negative meniscus lens element is provided on the image side of the third (i=3) negative meniscus lens element.

3. The fisheye lens system according to claim 2, wherein said fourth negative meniscus lens element satisfies the following condition:

$$0.8 < SF_{(i=4)}/SF_{(i=1)} < 2.5$$

wherein

SFi designates the shaping factor of the $i^{th}$ negative meniscus lens element ($SFi=(R1i-R2i)/(R1i+R2i)$);

R1$i$ designates the radius of curvature of the object-side surface of the $i^{th}$ negative meniscus lens element; and R2$i$ designates the radius of curvature of the image-side surface of the $i^{th}$ negative meniscus lens element.

4. The fisheye lens system according to claim 1, wherein each of said negative front lens group and said positive rear lens group further comprises at least one set of cemented lens elements constituted by a positive lens element and a negative lens element.

5. The fisheye lens system according to claim 1, satisfying the following conditions:

$$-0.5 < f/F < -0.1$$

$$0.75 < \{-\Delta y(90)/\Delta\theta(90)\}/(N_{OB} \cdot f) < 1.5$$

wherein fF designates the focal length of said negative front lens group;

f designates the focal length of the entire the fisheye lens system;

$\Delta\theta$ (90) designates an increment (differential amount) of the angle-of-view from the half angle-of-view of 90° (rad);

$\Delta y(90)$ designates an increment of an image height (differential amount) when the angle-of-view is increased by $\Delta\theta$ (90) from the half angle-of-view of 90°; and $N_{OB}$ designates the refractive index of air, i.e., on the object side of said negative front lens group.

6. The fisheye lens system according to claim 1, satisfying the following condition:

$$3.2 < fB/f < 5.0$$

wherein fB designates the back focal distance (the equivalent air thickness from the most image-side surface of said positive rear lens group to the imaging plane);

f designates the focal length of the entire fisheye lens system.

* * * * *